United States Patent
Quak et al.

(10) Patent No.: US 6,633,442 B2
(45) Date of Patent: Oct. 14, 2003

(54) ADJUSTING TRACK DENSITY AND BIT DENSITY TO PROVIDE LIMITED EXCESS CAPACITY IN A STORAGE DEVICE

(75) Inventors: BengWee Quak, Singapore (SG); KokHoe Chia, Singapore (SG); Tien Hiong Lee, Singapore (SG); Teck Khoon Lim, Singapore (SG); Kwee Teck Say, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 262 days.

(21) Appl. No.: 09/873,579

(22) Filed: Jun. 4, 2001

(65) Prior Publication Data

US 2002/0036849 A1 Mar. 28, 2002

Related U.S. Application Data

(60) Provisional application No. 60/222,995, filed on Aug. 4, 2000.

(51) Int. Cl.[7] .............................................. G11B 27/36
(52) U.S. Cl. .............................. 360/31; 360/48; 360/75
(58) Field of Search .............................. 360/31, 48, 69, 360/75; 369/53.1, 275.3; 324/210, 212, 226; 710/74; 711/112, 111

(56) References Cited

U.S. PATENT DOCUMENTS

| 4,945,427 A | 7/1990 | Cunningham |
| 5,596,458 A | 1/1997 | Emo et al. |
| 5,870,237 A | 2/1999 | Emo et al. |
| 5,999,351 A | 12/1999 | Albrecht et al. |
| 6,061,195 A | 5/2000 | Wilson et al. |
| 6,075,665 A | 6/2000 | Chainer et al. |
| 6,091,559 A | 7/2000 | Emo et al. |

FOREIGN PATENT DOCUMENTS

| WO | WO 00/01146 | 1/2000 |

OTHER PUBLICATIONS

U.S. patent application Ser. No. 09/885,302, Ding et al., filed Jun. 20, 2001.

*Primary Examiner*—Alan T. Faber
(74) *Attorney, Agent, or Firm*—Theodore M. Magee; Westman, Champlin & Kelly, P.A.

(57) ABSTRACT

A method sets bit densities and track densities for a plurality of heads in a data storage device. The method includes determining an initial bit density and an initial track density for each head. An initial total capacity for the storage device is determined based on the initial track densities and the initial bit densities. A desired capacity for the storage device is selected and the initial total capacity and the desired capacity are compared. One of either a bit density or a track density is then adjusted so that the data storage device has an adjusted capacity that provides some excess capacity over the desired capacity where the excess capacity is less than any excess capacity that was present between the initial capacity and the desired capacity. A data storage device formed through this method is also provided.

18 Claims, 4 Drawing Sheets

ADJUSTING TRACK DENSITY AND BIT DENSITY TO PROVIDE LIMITED EXCESS CAPACITY IN A STORAGE DEVICE

CROSS-REFERENCE TO RELATED APPLICATION

This application claims benefit of Provisional Application No. 60/222,995 filed Aug. 4, 2000 by BengWee Quak, KokHoe Chia, Tien Hiong Lee, Teck Khoon Lim, and Kwee Teck Say for "Variable Track Density and Variable Bit Density Compensation Methodology".

FIELD OF THE INVENTION

This invention relates to areal density in data storage devices and particularly to assigning different a real densities to different recording surfaces of a multi-surface hard disc drive.

BACKGROUND OF THE INVENTION

Areal data density represents the quantity of data (e.g., number of bits) that may be recorded in a given area of a recording surface. In a disc drive, areal density is a function of the track density, which is the number of tracks per inch (TPI) across the radius of the disc surface, and recording or bit density, which is the number of bits per inch (BPI) recorded along a track.

In the past, the track density was the same for all surfaces of the disc drive. The magnetic heads were manufactured to specifications based on the track density. Specifically, the widths of the read and write portions of the head were designed to not extend to an adjacent track and thus had to be smaller than or equal to the track width associated with the track density.

Like all manufacturing processes, the process for forming a head is susceptible to slight variations that result in heads with nonuniform widths. As the track density increases, these slight variations will cause a greater percentage of heads to fail initial testing because they are unable to meet the track density specification. This increase in failure rate increases manufacturing time and cost.

The present invention provides a solution to this and other problems, and offers other advantages over the prior art.

SUMMARY OF THE INVENTION

A method sets bit densities and track densities for a plurality of heads in a data storage device. The method includes determining an initial bit density value and an initial track density for each head. An initial total capacity for the storage device is determined based on the initial track densities and the initial bit densities. A desired capacity for the storage device is selected and the initial total capacity and the desired capacity are compared. One of either a bit density or track density is then adjusted so that the data storage device has an adjusted capacity that provides some excess capacity over the desired capacity where the excess capacity is less than any excess capacity that was present between the initial capacity and the desired capacity. A data storage device formed through this method is also provided.

Other features and benefits that characterize the present invention will be apparent upon reading the following detailed description and review of the associated drawings.

DETAILED DESCRIPTION OF ILLUSTRATIVE EMBODIMENTS

Figure 1:
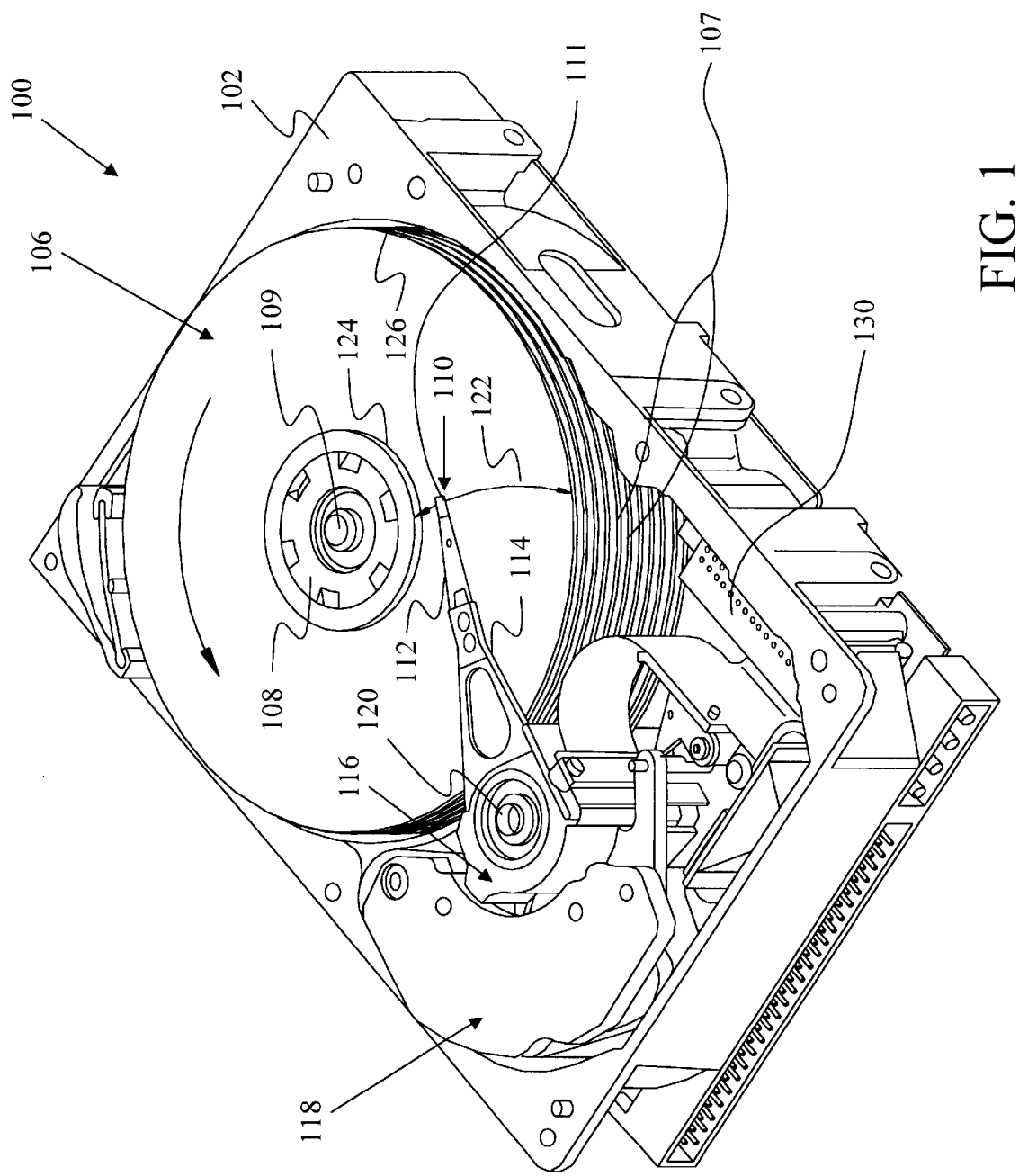
FIG. 1 is a perspective view of a disc drive in which aspects of the present invention may be practiced.

FIG. 1 is a perspective view of a disc drive 100 in which the present invention is useful. Disc drive 100 includes a housing with a base 102 and a top cover (not shown). Disc drive 100 further includes a disc pack 106, which is mounted on a spindle motor (not shown), by a disc clamp 108. Disc pack 106 includes a plurality of individual discs 107, which are mounted for co-rotation about central axis 109. Each disc surface has an associated disc head-slider 110 that is mounted to disc drive 100 for communication with the confronting disc surface. Head-slider 110 includes a slider structure arranged to fly above the associated disc surface of an individual disc of disc pack 106, and a transducing head 111 arranged to write data to, and read data from, concentric tracks on the confronting disc surface. The concentric tracks are, in effect, parallel to each other at different radii on the disc. In the example shown in FIG. 1, head-sliders 110 are supported by suspensions 112 which are in turn attached to track accessing arms 114 of an actuator 116. Actuator 116 is driven by a voice coil motor (VCM) 118 to rotate the actuator 116, and its attached heads 111, about a pivot shaft 120. Rotation of actuator 116 moves the heads 111 along an arcuate path 122 to position the heads 111 over a desired data track between a disc inner diameter 124 and a disc outer diameter 126. Voice coil motor 118 is driven by servo electronics included on circuit board 130 based on signals generated by the heads 111 of head-sliders 110 and a host computer (not shown). Read and write electronics are also included on circuit board 130 to supply signals to the host computer based on data read from disc pack 106 by the read heads of head-sliders 110, and to supply write signals to the write head of head-sliders 110 to write data to the discs 107. The present invention is implemented in the software or firmware programming of a controller on circuit board 130.

Figure 2:
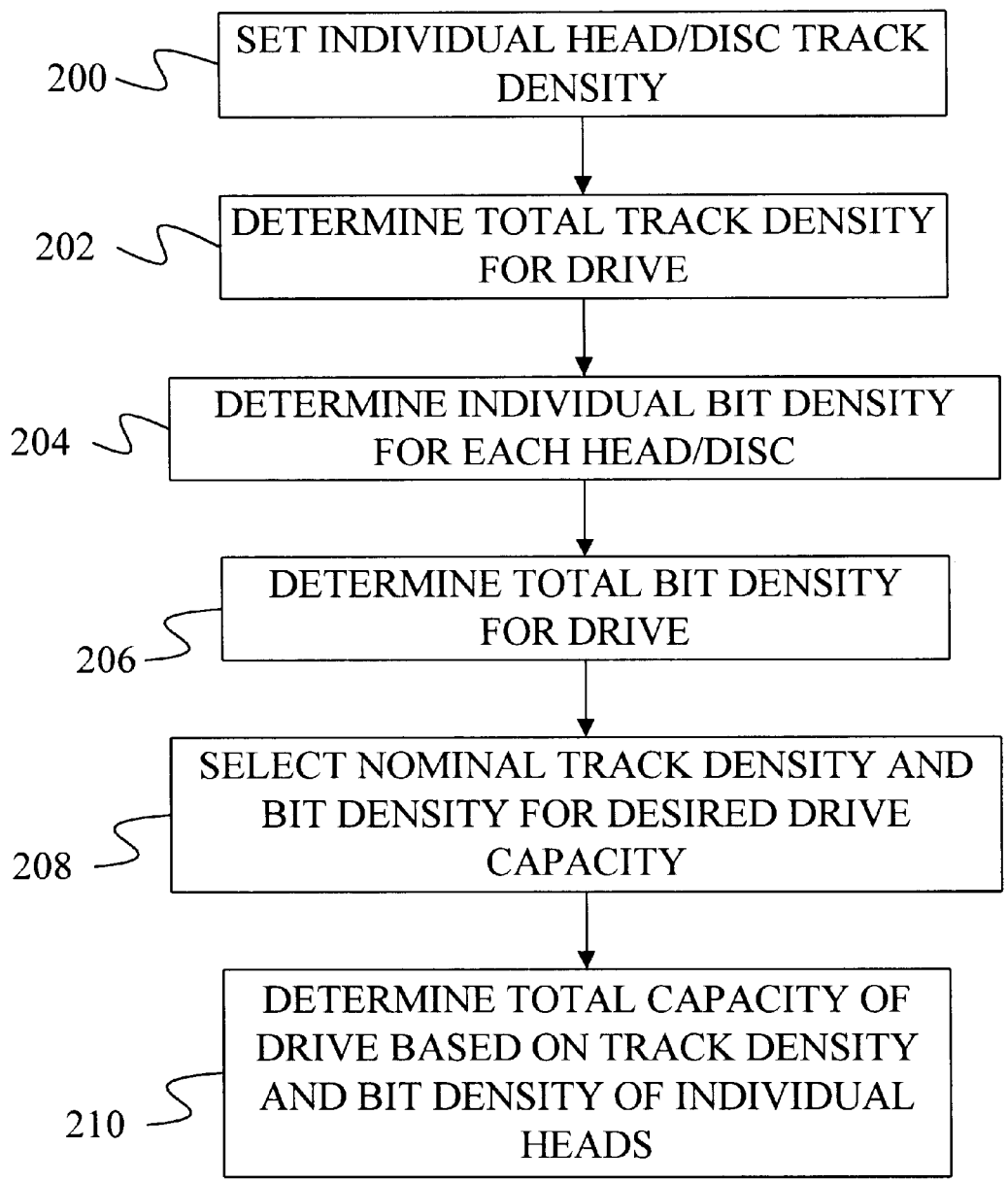
FIG. 2 is a flow diagram of a process of determining initial bit density and track density settings for a plurality of heads.
Figure 3:
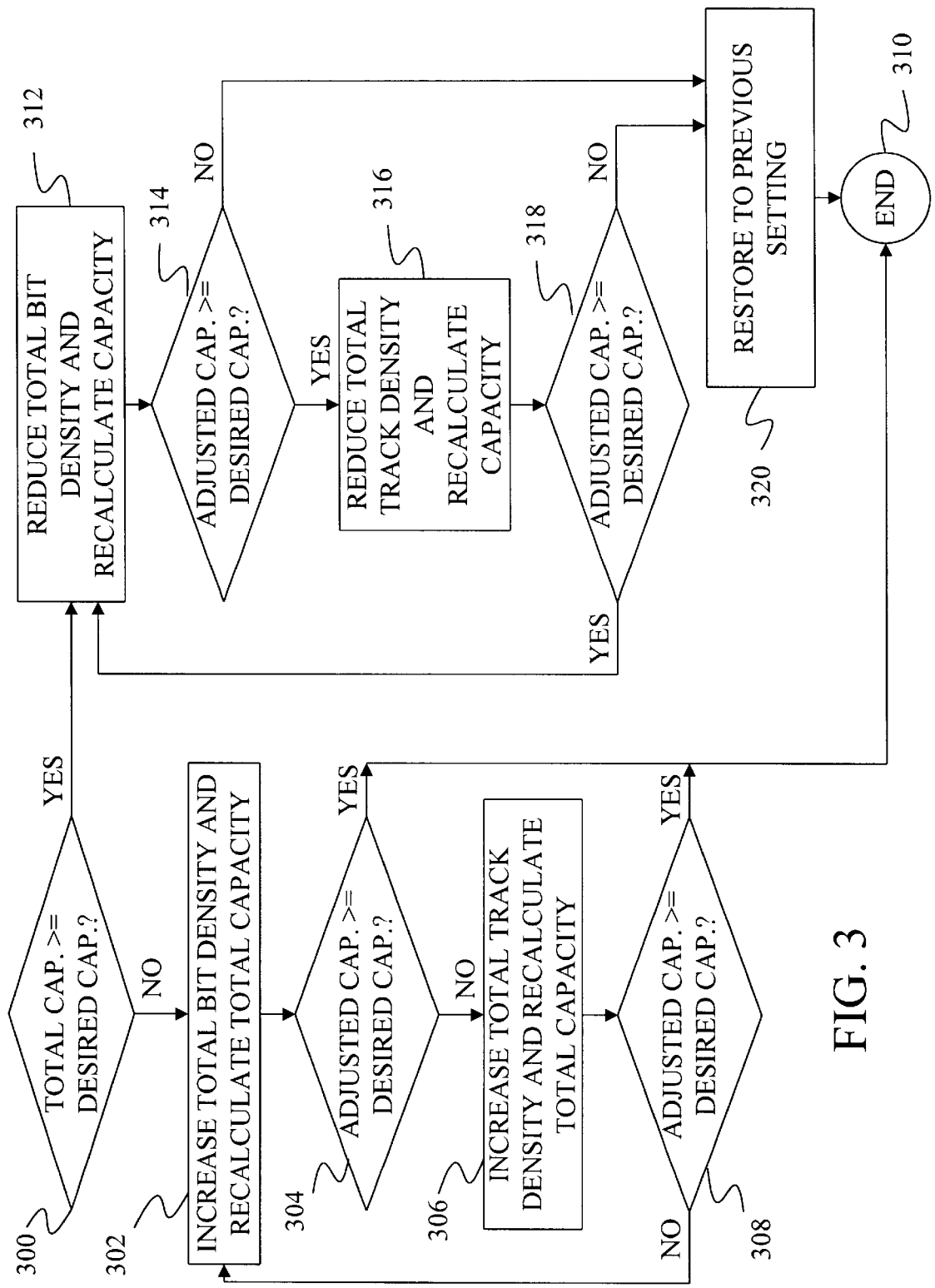
FIG. 3 is a flow diagram of a process for adjusting storage density values.
Figure 4:
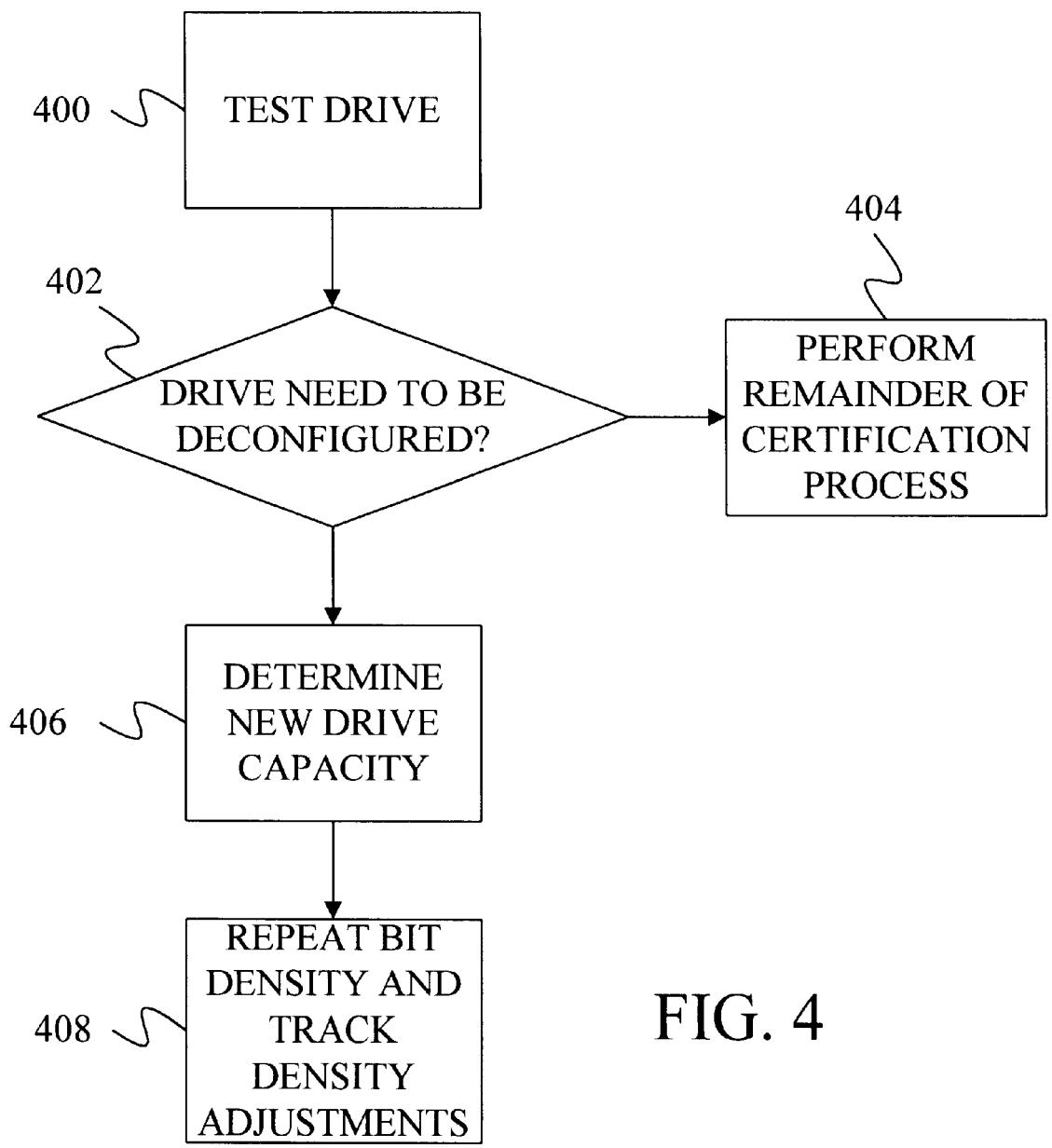
FIG. 4 is a flow diagram of a process for determining if the drive's performance requires that the drive's capacity be changed.

FIGS. 2, 3 and 4 provide flow diagrams that describe a method of setting storage density values such as track density and bit density for various heads 111 in a disc drive 100 under one embodiment of the present invention. In particular, FIG. 2 describes a process for determining initial track density and bit density settings for the various heads 111, FIG. 3 describes a process for adjusting those settings to achieve a desired capacity for the disc drive 100 while improving margins, and FIG. 4 describes a process for determining if the drive's performance with the track density and bit density adjustments will require the drive capacity to be changed.

In step 200 of FIG. 2, the track density for each head 111 in the drive 100 is determined. This can be determined by measuring the actual width of the read and write elements on each head or by writing test tracks with each head 111 and measuring the width of the written track. The track density for each head 111 is initially set independently of the track density of the other heads 111 in the disc drive. At step 202, the total track density for the disc drive 100 is determined by adding the individual track densities from each of the heads 111 in the drive.

In step 204, the bit density of each head 111 is determined. This can be accomplished by writing a series of test tracks to the disc 107 and reading the data back. Each test track is written and read using a different bit density. After the tracks are read, the number of errors in the read data is determined and the highest bit density to provide an acceptable number of errors is set as the maximum bit density for the head 111. To provide a margin of safety, a bit density that is less than the maximum bit density is selected for the head 111. For instance, under one embodiment, the selected bit density is 10 kilobytes per inch less than the maximum bit density. At step 206, the bit densities for the different heads 111 are added together to form a total bit density for the drive 100.

After the individual and total track densities and bit densities have been determined, the process of FIG. 2 selects nominal track densities and bit densities for the drive 100 at step 208. These nominal values are determined based on the desired capacity for the drive 100.

At step 210, the total capacity of the current drive 100 is determined from the individual track densities determined in step 200 and the individual bit densities determined in step 204. Under one embodiment, the total capacity associated with each head 111 is calculated as:

$$\sum_{i=0}^{TCount} 2\pi \cdot \left(r_{ID} + \frac{r_{OD} - r_{ID}}{TD}i\right) \cdot BD \qquad \text{EQ. 1}$$

where $$TCount = (r_{OD} - r_{ID}) \cdot TD \qquad \text{EQ.2}$$

and where TD is the track density for the head, BD is the bit density for the head, $r_{OD}$ is the radius at the outer diameter of the disc associated with the head, $r_{ID}$ is the radius at the inner diameter of the disc, and i provides a track count from track 0 to the maximum track count given by Equation 2. To determine the total capacity for the drive 100, the individual capacities associated with each head 111 are added together.

Once the total capacity for the drive 100 and the desired capacity for the drive have been determined, embodiments of the present invention try to adjust the track density and/or bit density of one or more heads 111 to form an adjusted capacity. In particular, the track densities and/or bit densities are adjusted so that there is excess capacity between the adjusted capacity and the desired capacity. In addition, if the initial total capacity of the drive provides excess capacity over the desired capacity, the track densities and/or bit densities are adjusted to reduce that excess as much as possible while keeping the adjusted capacity above the desired capacity. By reducing this excess capacity, embodiments of the present invention improve the margins between the maximum track densities and bit densities for the heads 111 and the track densities and bit densities at which they are operated.

The process of adjusting the track density and bit density for the heads 111 begins at step 300 of FIG. 3. In step 300, the total capacity is compared to the desired capacity. If the total capacity is less than the desired capacity, the process continues at step 302 where the total bit density for the drive 100 is increased. Under one embodiment, this is accomplished by selecting to increase the bit density of the head 111 with the lowest current bit density. In other embodiments, this is achieved by increasing the bit density of the head 111 that has the highest track density. By selecting this head 111, this embodiment of the invention maximizes the affects of raising the bit density by increasing the drive's total capacity as much as possible.

After the bit density has been increased and the total capacity recalculated, the adjusted total capacity is compared to the desired capacity at step 304. If the adjusted capacity is still less than the desired capacity, the total track density of the drive 100 is increased at step 306 and the total capacity of the drive 100 is recalculated.

Under one embodiment, the increase in track density is achieved by increasing the track density of the head 111 with the lowest track density. In other embodiments, the increase in total track density is achieved by increasing the track density of the head 111 with the highest bit density so as to maximize the gain in total capacity.

After the total track density has been increased and the capacity of the drive 100 has been recalculated, the adjusted capacity is compared to the desired capacity at step 308. If the adjusted capacity is still below the desired capacity, the process returns to step 302 to increase the total bit density again. Steps 302, 304, 306, and 308 are repeated until the total capacity of the drive exceeds the desired capacity at either step 304 or step 308.

Under some embodiments of the invention, when steps 302 and 306 are repeated, an effort is made to not increase the bit density or track density of a head 111 twice. This helps to limit the extent to which each head 111 is pushed beyond its initial measured values for track density and bit density.

When the total capacity of the drive 100 reaches or exceeds the desired capacity at step 304 or 308, the process of adjusting the bit densities and track densities for the drive ends at step 310.

Note that although FIG. 3 shows the bit density being adjusted before the track density in each iteration of steps 302, 304, 306, and 308, in other embodiments the track density is adjusted before the bit density.

Returning to step 300, if the initial total capacity of the drive 100 exceeds the desired capacity, a series of steps are performed to reduce the bit density and/or the track density of one or more of the heads 111. By reducing these values, the present invention improves the margin between the head's maximum bit density and maximum track density and the head's operating bit density and operating track density.

The process of reducing these storage densities begins at step 312, where the total bit density for the drive 100 is reduced by reducing the bit density of one of the heads 111. Under one embodiment, this is achieved by reducing the bit density of the head 111 with the highest bit density. In other embodiments, this is achieved by reducing the bit density of the head 111 with the lowest track density in order to minimize the impact on drive 100 capacity. After the total bit density is reduced, an adjusted capacity for the drive is calculated using the new bit densities.

At step 314, the adjusted capacity is compared to the desired capacity to see if the reduction in bit density caused too much of a decrease in capacity. If the adjusted capacity is still above the desired capacity, the process continues at step 316, where the total track density for the drive 100 is reduced and the capacity of the drive 100 is recalculated.

Under one embodiment, the reduction in track density is achieved by reducing the track density of the head 111 with the highest track density. In other embodiments, the head 111 with the lowest bit density value has its track density reduced in order to limit the drop in total capacity caused by the reduction in track density.

After the total track density has been reduced and the adjusted capacity has been recalculated, the adjusted capacity is compared to the desired capacity at step 318. If the adjusted capacity is still above the desired capacity at step 318, the process returns to step 312 to once again reduce the bit density of the drive 100.

Steps 312, 314, 316, and 318 are repeated as long as the adjusted capacity remains above the desired capacity. Under some embodiments, an effort is made to spread the reduction in bit density and track density across as many heads 111 as possible. As such, these embodiments reduce a storage density value for each head 111 once before reducing a storage density value of any head 111 twice.

If the adjusted capacity drops below the desired capacity at either step 314 or step 318, the process of FIG. 3 restores the bit density and track density settings to their previous state at step 320. Thus, if the total capacity is below the desired capacity at step 314, the last reduction in bit density performed at step 314 is reversed. Similarly, if the total capacity is below the desired capacity at step 318, the last reduction in track density is reversed. After step 320, the process of adjusting track density and bit density ends at step 310.

Note that although the bit density was decreased before the track density in FIG. 3, in other embodiments, the track density is decreased before the bit density.

After the track density and bit density adjustments are complete, the drive 100 is tested at step 400 of FIG. 4 to see if the drive 100 operates properly with the new bit density and track density settings. This testing can include testing for any number of characteristics such as Off-Track Capabilities (OTC), Track Mis-Registration (MTR) including Write-To-Read Tolerance and Write-to-Write Tolerance, and data error rates.

After testing, the results of the tests are examined at step 402 to determine if the drive 100 should be deconfigured to a lower capacity. If the results of the test indicate that the drive 100 performs within specification at step 402, the remainder of the certification process is performed at step 404.

However, if the drive 100 does not meet specification with the current bit density and track density settings, the drive 100 is deconfigured by selecting a new desired capacity for the drive 100 at step 406. For example, if the initial desired capacity was 20 Gigabytes, a failing drive could be deconfigured to be a 15 Gigabyte drive.

After the new desired capacity has been determined, the process of FIG. 3 for adjusting bit density and track density is repeated for the new desired capacity as shown by step 408. Under some embodiments, the adjusted settings for the bit densities and track densities that were produced before deconfiguration are used as the starting bit densities and track densities when the process of FIG. 3 is repeated. In other embodiments, the bit densities and track densities are reset to the initial values they had before the adjustment process of FIG. 3.

The process of FIG. 3 for adjusting bit density and track density can be used on any combination of total bit density and total track density for a drive 100. In particular, the process of FIG. 3 can be used regardless of whether the total bit density and/or total track density is above or below a nominal track density and nominal bit density determined for the desired capacity of the drive 100.

For example, table 1 below shows the changes in total track density and total bit density for a drive 100 that had a total track density and a total bit density that were above the nominal track density and nominal bit density, respectively.

TABLE 1

| | Excess bit density | Excess track density | Total Capacity >= Desired Capacity |
|---|---|---|---|
| Initial Setting | 7 | 2 | YES |
| 1st adjustment | 6 | 2 | YES |
| 2nd adjustment | 6 | 1 | YES |
| 3rd adjustment | 5 | 1 | YES |
| 4th adjustment | 5 | 0 | YES |
| 5th adjustment | 4 | 0 | YES |
| 6th adjustment | 4 | −1 | YES |
| 7th adjustment | 3 | −1 | YES |
| 8th adjustment | 3 | −2 | YES |
| 9th adjustment | 2 | −2 | NO |

In Table 1, excess bit density is the difference between the total bit density and the nominal bit density and excess track density is the difference between the total track density and the nominal track density. After the ninth adjustment, the capacity has dropped below the desired capacity. Because of this, the bit density and track density settings produced by the eighth adjustment are used as the final bit density and track density settings.

The process of FIG. 3 can also be used if the track density and bit density values provide a capacity that is greater than the desired capacity but one of these values is below their nominal values. For example, table 2 shows the affects of adjustment on a drive 100 that initially exceeds the desired capacity but has an initial bit density value that is below the nominal bit density value.

TABLE 2

| | Excess bit density | Excess track density | Total Capacity >= Desired Capacity |
|---|---|---|---|
| Initial Setting | −1 | 6 | YES |
| 1st adjustment | −2 | 6 | YES |
| 2nd adjustment | −2 | 5 | YES |
| 3rd adjustment | −3 | 5 | YES |
| 4th adjustment | −3 | 4 | YES |
| 5th adjustment | −4 | 4 | YES |
| 6th adjustment | −4 | 3 | NO |

Similarly, Table 3 shows the affects of adjustment on a drive 100 that exceeds capacity but has an initial track density value that is below the nominal value.

TABLE 3

| | Excess bit density | Excess track density | Total Capacity >= Desired Capacity |
|---|---|---|---|
| Initial Setting | 5 | −1 | YES |
| 1st adjustment | 4 | −1 | YES |
| 2nd adjustment | 4 | −2 | YES |
| 3rd adjustment | 3 | −2 | YES |
| 4th adjustment | 3 | −3 | NO |

The process of FIG. 3 can also be used when the drive 100 is below capacity because the track density, the bit density or both are below their nominal values. For example, table 4 shows the effects of adjustment when the bit density is below the nominal value and the drive is below the capacity requirement.

TABLE 4

| | Excess bit density | Excess track density | Total Capacity >= Desired Capacity |
|---|---|---|---|
| Initial Setting | −7 | 4 | NO |
| 1st adjustment | −6 | 4 | NO |
| 2nd adjustment | −6 | 5 | NO |
| 3rd adjustment | −5 | 5 | YES |

Note that in table 4 the bit density and track density for the drive are increased until the drive 100 meets the desired capacity; for example, after the third adjustment.

Similarly, table 5 shows the effects of adjustment on a drive 100 that does not meet the capacity requirements and that has an initial track density that is below the nominal value.

TABLE 5

| | Excess bit density | Excess track density | Total Capacity >= Desired Capacity |
|---|---|---|---|
| Initial Setting | 2 | −6 | NO |
| 1st adjustment | 3 | −6 | NO |
| 2nd adjustment | 3 | −5 | NO |
| 3rd adjustment | 4 | −5 | NO |
| 4th adjustment | 4 | −4 | NO |
| 5th adjustment | 5 | −4 | NO |
| 6th adjustment | 5 | −3 | YES |

Lastly, table 6 shows the effects of adjusting bit density and track density in a drive 100 that does not meet the desired capacity and that has a bit density value and a track density value that are less the nominal values.

TABLE 6

| | Excess bit density | Excess track density | Total Capacity >= Desired Capacity |
|---|---|---|---|
| Initial Setting | −2 | −4 | NO |
| 1st adjustment | −1 | −4 | NO |
| 2nd adjustment | −1 | −3 | NO |
| 3rd adjustment | 0 | −3 | NO |
| 4th adjustment | 0 | −2 | NO |
| 5th adjustment | 1 | −2 | NO |
| 6th adjustment | 1 | −1 | YES |

In summary, the present invention provides a method of setting bit densities and track densities for a plurality of heads 111 in a data storage device 100. The method includes a step 204 of determining an initial bit density value for each head 111 and a step 200 of determining an initial track density for each head 111. An initial total capacity for the storage device 100 is determined at a step 210 based on the initial track densities and the initial bit densities. A desired capacity for the storage device 100 is selected at a step 208 and the initial total capacity and the desired capacity are compared at a step 300. One of either a bit density or track density is then adjusted 302, 306, 312, 316, 320, so that the data storage device 100 has an adjusted capacity that provides some excess capacity over the desired capacity where the excess capacity is less than any excess capacity that was present between the initial capacity and the desired capacity.

A data storage device 100 is also provided that includes a plurality of heads 111 and a controller 130 for controlling the position of the heads and the rate at which the head reads to or writes from a surface. The position of the head 111 and the read/write rates are determined based in part on track densities and bit densities that together form storage densities. The storage densities are formed through a process that begins by selecting (step 208) a desired capacity for the storage device. Initial storage densities are then selected (steps 200 and 204), before a total initial capacity for the storage device is determined (step 210). At least one of the storage densities is changed (steps 302, 306, 312, 316, 320) to form an adjusted capacity that has an excess capacity beyond the desired capacity, where the excess capacity is less than any excess capacity between the total initial capacity and the desired capacity.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the variable track density technique while maintaining substantially the same functionality without departing from the scope and spirit of the present invention. In addition, although the preferred embodiment described herein is directed to a technique for optimizing track density for an embedded servo disc drive system, it will be appreciated by those skilled in the art that the teachings of the present invention can be applied to other systems, such as dedicated servo disc drive systems employing servo information on a dedicated servo surface, to optical disc drive systems and to systems whose servo controls do not rely on information recorded on the movable storage medium, such as tape drive systems, without departing from the scope and spirit of the present invention.

What is claimed is:

1. A method of minimizing excess storage capacity in a data storage device by adjusting storage density within at least one storage surface, the storage surface having a read/write head operatively disposed in a data reading and writing relationship therewith, the method comprising:
   (a) determining a separate initial bit density for each head;
   (b) determining a separate initial track density for each head;
   (c) calculating an initial total capacity for the data storage device based on all of the initial bit densities and all of the initial track densities;
   (d) selecting a desired capacity for the drive, thereby defining an initial excess capacity, if any, as the total initial capacity in comparison to the desired capacity; and
   (e) adjusting either one of the bit densities or one of the track densities so that the data storage device has an adjusted capacity defining an adjusted excess capacity in comparison to the desired capacity, the adjusted excess capacity being less than the initial excess capacity, if there was an initial excess capacity.

2. The method of claim 1 wherein adjusting step (e) comprises increasing a bit density.

3. The method of claim 1 wherein adjusting step (e) comprises increasing a track density.

4. The method of claim 1 wherein adjusting step (e) comprises:
   (e)(i) decreasing one of either the bit density or the track density of one of the heads; and
   (e)(ii) determining if the adjusted capacity is less than the desired capacity.

5. The method of claim 4 wherein adjusting step (e) further comprises:
- (e)(iii) repeating decreasing step (e)(i) and determining step (e)(ii) until the adjusted capacity is less than the desired capacity; and
- (e)(iv) reversing the last decrease provided by decreasing step (e)(i) so that the adjusted capacity is greater than the desired capacity.

6. The method of claim 5 wherein repeating step (e)(iii) comprises alternatingly decreasing the bit density of one of the heads and the track density of one of the heads with each repetition of decreasing step (e)(i).

7. The method of claim 5 wherein repeating step (e)(iii) comprises decreasing either the bit density or the track density for a different one of the heads with each repetition of decreasing step (e)(i).

8. The method of claim 1 further comprising:
- (f) determining the performance of the storage device while using the bit densities and track densities associated with the adjusted capacity.

9. The method of claim 8 further comprising:
- (g) deconfiguring the storage device by setting a lowered desired capacity for the drive and repeating steps (a), (b), (c), and (e) using the lowered desired capacity.

10. A data storage device for storing data on one of a plurality of storage surfaces, the storage device comprising:
- a plurality of heads, each head capable of reading from and writing to a storage surface at a head-specific bit density and a head-specific track density; and
- a controller for controlling the position of the heads based in part on the track density for each head and for controlling the rates at which the heads write to and read from the storage surfaces based in part on the bit density for each head, the track densities and bit densities together forming storage densities that are defined through a processes comprising:
- selecting a desired capacity for the storage device;
- determining initial data storage densities associated with each head, the initial data storage densities comprising an initial bit density and an initial track density;
- determining a total initial capacity for the storage device based on the initial data storage densities;
- selecting a desired capacity for the storage device, thereby defining an initial excess capacity, if any, as the total initial capacity in comparison to the desired capacity;
- adjusting at least one of the initial data storage densities so that the data storage devices has an adjusted capacity defining an adjusted excess capacity in comparison to the desired capacity, the adjusted excess capacity being less than the initial excess capacity, if there is an initial excess capacity.

11. The data storage device of claim 10 wherein adjusting at least one of the initial data storage densities comprises increasing the bit density for one of the heads.

12. The data storage device of claim 10 wherein adjusting at least one of the initial data storage densities comprises increasing the track density for one of the heads.

13. The data storage device of claim 10 wherein adjusting at least one of the initial data storage densities comprises reducing one of the initial data storage densities for one of the heads.

14. The data storage device of claim 10 wherein adjusting at least one of the initial data storage densities further comprises:
- decreasing one of the initial data storage densities defining adjusted storage densities;
- determining the adjusted capacity based on the adjusted storage densities;
- comparing the adjusted capacity to the desired capacity; and
- if the adjusted capacity is less than the desired capacity, reversing the last decrease in the initial data storage densities and determining a new adjusted capacity.

15. The data storage device of claim 14 wherein the steps of decreasing the storage density, determining an adjusted capacity, and comparing the adjusted capacity to the desired capacity are repeated until the adjusted capacity is less than the desired capacity.

16. The data storage device of claim 15 wherein each step of reducing a storage density involves reducing a different storage density from the storage densities that were previously reduced.

17. The data storage device of claim 10 wherein the process for defining data storage densities further comprises:
- testing the storage device while using the adjusted storage densities;
- determining that the storage device fails read/write testing;
- deconfiguring the storage device by selecting a lower desired capacity for the storage device; and
- repeating the step of adjusting the storage densities based on the lower desired capacity.

18. A method of producing a data storage device for storing data, the method comprising:
- selecting initial storage densities for a plurality of heads of the storage device; and
- storage density adjustment steps for adjusting the storage densities of the storage device to reduce excess storage capacity present in the storage device.

* * * * *

UNITED STATES PATENT AND TRADEMARK OFFICE
CERTIFICATE OF CORRECTION

PATENT NO. : 6,633,442 B2
DATED : October 14, 2003
INVENTOR(S) : BengWee Quak et al.

It is certified that error appears in the above-identified patent and that said Letters Patent is hereby corrected as shown below:

<u>Column 3,</u>
Line 25, equation 1, change "t=0" to -- i=0 --

Signed and Sealed this

Eighteenth Day of May, 2004

JON W. DUDAS
*Acting Director of the United States Patent and Trademark Office*